United States Patent [19]
Burgin

[11] Patent Number: 5,861,178
[45] Date of Patent: Jan. 19, 1999

[54] PREPARATION AND USE OF A PROTEIN-ENRICHED SOLUBLE FIBER COMPOSITION

[76] Inventor: Lila Burgin, 707 Starboard Ave., Edgewater, Fla. 32141

[21] Appl. No.: 557,215

[22] Filed: Nov. 14, 1995

[51] Int. Cl.⁶ ....................................................... A23L 1/00
[52] U.S. Cl. ......................... 424/499; 424/484; 424/489; 424/78.1; 426/465
[58] Field of Search .................................... 424/484, 489, 424/499, 195.1, 78.1; 426/429, 577, 616, 665, 443, 465

[56] References Cited

U.S. PATENT DOCUMENTS 4,497,838   2/1985   Bonnell .

OTHER PUBLICATIONS

Reiser, S. (1987) "Metabolic Effects of Dietary Pectins Related to Human Health" Food Technology, Feb.: 91–99.
Baekey, P.A. et al. (1988) "grapefruit Pectin Inhibits Hypercholersterolemia and Atherosclerosis in Miniature Swine" Clin. Cardiol. 11:595–600.
Cerda, J.J. et al. (1988) "The Effects of Grapefruit Pectin on Patients at Risk for Coronary Heart Disease Without Altering Diet or Lifestyle" Clin. Cardiology 11:589–594.
Cerda, J.J. et al. (1994) "Inhibition of Atherosclerosis by Dietary Pectin in Microswine With Sustained Hypercholesterolemia" Circulation 89(3):1247–1253.
Cerda, J.J. (1994) "The Pectin–Cholesterol Connection—A Review Technology: Journal of The Franklin Insitute" 331A:199–202.

*Primary Examiner*—Raj Bawa
*Attorney, Agent, or Firm*—Saliwanchik, Lloyd & Saliwanchik

[57] ABSTRACT

Described are compositions comprising a desired material, e.g., a soluble fiber, entrapped within a protein matrix, and methods of preparation and use thereof. In a preferred embodiment, the subject invention provides a method for entrapping a soluble fiber compound within a protein matrix, wherein the method comprises the following steps: (a) a soluble fiber compound is first mixed with undenatured protein to create a uniform dispersion, wherein the dispersion thus created comprises protein at a concentration of at least about 25% and soluble fiber at a concentration of less than about 75%; (b) the dispersion created in step (a) is then mixed with water and subjected to elevated pressures, wherein the pressures reduce the water content of the composition to less than about 50%, thereby forcing the protein and the soluble fiber compound into close molecular proximity; and (c) the dispersion is then subjected to heat of at least about 300° F., thereby entrapping the soluble fiber compound within the protein matrix, and wherein the heating process reduces the water content of the composition to less than about 5%.

10 Claims, No Drawings

PREPARATION AND USE OF A PROTEIN-ENRICHED SOLUBLE FIBER COMPOSITION

BACKGROUND OF THE INVENTION

1. Field of the Invention

This invention relates to methods for preparing a protein-enriched soluble fiber composition and the use of this material in making a dietary supplement.

2. Related Art

The soluble fiber useful according to the subject invention is well known to those skilled in this art. Specifically exemplified herein is the use of pectin and guar gum compositions as the soluble fiber source. Pectins are a group of high-molecular-weight heterogenous polysaccharides which serve as fundamental structural components of plant cell walls in fruits and vegetables, particularly limes, lemons, grapefruit, and oranges. Pectin is composed of D-anhydrogalacturonic acid units linked through $\alpha(1\rightarrow4)$-glycosidic bonds forming a polygalacturonic acid with some of the carboxyl groups esterified with methanol. Since pectin and guar gum are not susceptible to hydrolysis by the alimentary tract enzymes of humans, it is classified as a water-soluble fiber dietary supplement.

Soluble fiber products are often manufactured by aqueous extraction of appropriate edible plant material such as those enumerated above. Several specific examples are discussed below.

Guar gum. Guar gum is derived from the seed of the guar plant. The plant has been grown in India and Pakistan for centuries. The guar plant is a pod-bearing legume. The seeds of the plant are composed of the hull, germ, and endosperm. Guar gum is produced by milling the endosperm after removal of the hull and germ.

Guar gum, which has a molecular weight of about 220,000–300,000, is a galactomannan with linear chains of D-galactomannopyranosyl units with side branching units of D-galactopyranose attached by $(1\rightarrow6)$ linkages.

Guar gum is nonionic and is compatible with salts over a wide range of electrolyte concentration. The hydration and water-binding properties of guar gum are responsible for its use in food stabilization systems. Ice cream stabilizers, particularly high-temperature, short-time processes, use guar gum, at a concentration of 0.3%. These same properties render it useful in the stabilization of ice pops and sherbets. Guar is allowed at levels up to 3.0% in cold-pack cheese foods. In soft cheeses, guar increases the yield of curd solids and gives curds a better texture. It is useful in cake and donut mixes at levels under 1%. In pie fillings, guar thickens and prevents shrinking and cracking of the filling. Used in icings to absorb free water, guar gum is mixed at a level of 1 part gum to 250 parts sugar and 30 parts water.

Guar gum has also been used as a thickener in salad dressings and pickle and relish sauces at 0.2–0.8%. Gum guar alone or in combination with agar at levels of 0.5% is useful in processing canned meat products. It prevents fat migration during storage and stops syneresis and water accumulation and reduces the tendency for voids to be present in the can.

Locust bean gum. The locust bean, or carob, is an ancient leguminous plant. It is indigenous to the Mediterranean and Near East. Arabs used the carob seed as a unit of weight. The seed, called karat, became a standard (carats) against which gold and precious gems were weighed. The carob pod or fruit has been widely used as a foodstuff. It is very sweet, and its flavor is further enhanced by roasting. The carob fruit is dark brown, 4–10 inches long, and pod-like. The pod contains the seed which is the source of locust bean gum. The seed is composed of the outer husk, a central germ, and the endosperm. The semitransparent layer of endosperm yields the desired gum. In commerce the seed is dehusked, split, and the germ removed. The separated endosperm is finely milled. The gum is an off-white powder.

Locust bean gum, which has a molecular weight of 310,000, is essentially a straight D-mannose polymer with branching on every fourth or fifth mannose group on C-6 by single D-galactose units. The structure is similar to that of gum guar.

Locust bean gum is widely used today in many industries. It is an excellent ice cream stabilizer. Carob bean gum acts as a binder and stabilizer in processed meats, salami, bologna, and pork sausages. In soft cheese manufacture, about 0.5% locust bean gum speeds up coagulation, increases the yield of curd solids by about 10%, and makes the curd easier to separate and remove. Locust bean gum is sometimes used to thicken soups at levels of 0.2–0.5%. Locust bean gum is used as a thickener in pie fillings. The gum yields a clear, fruit-like filling when used at a level of 1–2% of the weight of the fruit juice and water. In bakery products the use of high quality locust bean gum produces more uniform doughs. Locust bean gum is utilized as a stabilizer and binder in many prepared foods such as soup bases, sauces, frozen batter, and vegetable and fish dishes. IT has been used to stabilized whipped cream, mayonnaise, and tomato ketchup, as well as salad dressings.

Gum arabic. Gum arabic is the dried, gummy exudate obtained from *Acacia senegal* and various other *Acacia* species. The exudation of gum arabic is a pathological condition attributed to unhealthy trees, as the gum is produced from breaks or wounds in the bark of the tree. Arabic was known over 4,000 years ago and is the most common and universally used of all of the natural gums.

Gum arabic is official in the *U.S. Pharmacopeia* (U.S. Pharmacopeial Convention, 1975) as well as the *Food Chemicals Codex* (Natl. Acad. Sci.-Natl. Res. Council, 1972). It is on the GRAS (generally recognized as safe) list under the Federal Food, Drug, and Cosmetic Act.

Gum arabic is a neutral or slightly acidic salt of a complex polysaccharide containing calcium, magnesium, and potassium ions. The main molecular structure is a chain of $\beta$-galactopyranose units with some substitution at the C-6 position with various side chains.

Gum arabic is the most widely used of all the plant hydrocolloids. It is compatible with other gums, proteins, carbohydrates, and starches. It is commonly employed at a level of 2 lb/gallon of emulsion. It also serves to stabilize foams in the manufacture of soft drinks and beer. About 3 lb is enough to stabilize 50 barrels of beer. Gum arabic is also used in dairy products such as ices, sherbets, and ice creams. Here it functions to retard both ice crystal formation and growth.

Gum arabic is widely used in the candy industry. The gum is used to emulsify fats and retard sugar crystallization. It is used as a glaze in candy products and as a component of chewing gum, cough drops, and candy lozenges. Lozenges are also prepared from gum arabic by mixing finely ground or powdered sugar with a thick mucilage of gum arabic. Dietetic or sugarless hard candy drops and jujubes can be prepared from combinations of gum arabic, sorbitol, and mannitol. Arabic at a level of 1–3% will give a hard candy, 5–35% a medium center, and a soft drop can be obtained utilizing approximately 70% gum. The greater the percentage of arabic, the softer and more chewable the candy. An excellent glaze for marzipan and buns, gum arabic also acts as a protective coating in panned confectionery goods, and may be used in coating nuts. Gum arabic also improves the baking properties of rye and wheat flour at levels as little as 0.015%. The gum extends the shelf-life of bread by rendering it softer. It truly has universal applications.

Pectin. Food-grade pectin consists of partially methylated polygalacturonic acid units and is normally classified according to its degree of esterification or methoxyl content.

In high ester or high methoxyl (HM) pectin, a relatively high portion of the carboxyl groups occur as methyl ester and the remaining carboxylic acid groups are in the form of the free acid or as its ammonium, potassium, calcium, or sodium salt. Pectin in which less than 50% of the available carboxyl acid groups occur as the methyl ester is normally referred to as low methoxyl (LM) pectin. In general, LM pectin is obtained from HM pectin by a treatment such as mild acid or alkaline conditions. Amidated pectin is obtained from HM pectin when ammonia is used in the alkaline deesterification process. In this type of pectin, some of the remaining carboxylic acid groups have been transformed into the acid amide. Commercial soluble fibers are normally blended with sugars for standardization purposes, and some types may contain suitable food-grade buffer salts required for pH control and desirable setting characteristics.

Since it is a constituent of all plants, soluble fiber has long been part of the human diet. Pectin has been evaluated and cleared toxicologically by the Joint FAO/WHO Expert Committee on Food Additives. National and international food regulations recognize that pectin is a valuable food gelling agent and harmless food additive. Pectin is included in the list of permitted additives in standardized foods when a technological need can be proven.

Soluble fiber has been shown to be an effective hypocholesterolemic agent with minimal side effects (Reiser [1987] *Food Technol.* 31–91). It has also been found that grapefruit pectin inhibits hypercholesterolemia and atherosclerosis in miniature swine (Baekey et al. [1988] *Clin. Cardiology* 11:595–600). Furthermore, grapefruit pectin has proved to lower plasma cholesterol in human volunteers who were hypercholesterolemic, and to improve the ratio of low density lipoprotein cholesterol (LDLC) to high density lipoprotein cholesterol (HDLC) (Cerda [1988] *Clin. Cardiology* 11:589–594).

U.S. Pat. No. 4,497,838 describes the preparation of various orange products from orange peels. The preparation involves extraction of orange peels with a non-aqueous water-miscible solvent. The solvent-extracted peel is dried to produce a product high in cellulose and pectin.

Simple methods which allow the manufacture of soluble fiber food compositions are needed to provide the general public with dietary forms of soluble fiber. The present invention provides a preparation method which achieves this goal.

BRIEF SUMMARY OF THE INVENTION

The subject invention concerns a unique method for entrapping a material within a protein matrix. Advantageously, the entrapped material, when eaten, will move through the stomach to the intestine before the protein is broken down, which then releases the entrapped compound.

Specifically exemplified is a simple and efficient procedure to prepare a soluble fiber product entrapped in a protein matrix which can be included in edible foodstuffs or can be readily homogenized as an additive to drinkable fluids such as beverages.

In a preferred embodiment of the subject invention, the soluble fiber and protein composition is prepared by a process which comprises a critical compression step which imparts unique and advantageous properties to the final product. Specifically exemplified herein is a process wherein the compression step utilizes an extruder to compress the water soluble fiber/protein composition. The extrusion step is followed by drying and then sizing.

One specific embodiment of the subject invention pertains to a three-step process for producing the soluble fiber product. In a first step, protein and soluble fiber are blended to create a uniform dispersion of these ingredients. Once the uniform dispersion of protein and soluble fiber is created, the dispersion is mixed with water and introduced into an extruder as the second step of the process. The final step of the process involves drying and sizing of the compressed protein-enriched soluble fiber product.

In the initial mixing step, a range of protein from about 25% to about 60% can be used. The soluble fiber content can range from about 40% to about 75%. Preferably, the composition further comprises about 0% to about 5% oil. After the initial blending, water is added to create a water content of about 40% to about 50%, preferably about 46% to about 48%. In the second step of the process, the extrusion is carried out so that the product leaving the extruder still comprises less than 50% water and, preferably, comprises about 46–48% water. The product is then dried. The water content of the product after drying is preferably less than about 5%, more preferably less than about 3%, and most preferably is about 1–2%.

In a preferred embodiment, the soluble fiber component comprises a majority of guar gum and a smaller component of pectin. Preferred in the method is the use of citrus (e.g., grapefruit) pectin, particularly HM pectin, as the pectin source. Preferred sources of the protein include egg white or skimmed milk. Preferably, all ingredients are dry-based.

A further aspect of the present invention is an edible foodstuff or beverage containing the protein-enriched soluble fiber composition prepared by the aforementioned method. Edible foodstuffs and beverages to which the composition of the subject invention can be added include desserts, salad dressings, gelatin desserts, puddings, carbonated beverages, and juices.

A further aspect of the present invention is a dietary supplement comprising a protein-enriched soluble fiber composition prepared according to the aforementioned method.

DETAILED DISCLOSURE OF THE INVENTION

The subject invention concerns a process for entrapping a material within a protein matrix. In a preferred embodiment, the subject invention concerns a unique process for creating a protein-enriched soluble fiber composition. The present method for preparing a protein-enriched soluble fiber composition includes an initial step of contacting soluble fiber with a water-soluble, edible protein. Water is added to the mixture. Following this initial contacting step, the composition is subjected to elevated pressures sufficient to bring the protein and soluble fiber into close molecular proximity. Close molecular proximity means that the soluble fiber can be entrapped within the protein matrix when the protein is denatured by a heat treatment. Preferably, the soluble fiber is hydrated by the elevated pressure. The pressure necessary for this step is preferably provided by an extrusion process.

The composition produced according to the subject invention has advantageous properties in terms of its taste, consistency, stability, and its physiological properties. The process of the subject invention yields a product rich in soluble fiber, wherein that fiber is entrapped within a protein matrix. The product of the subject invention can be stored for extended periods of time without losing its vital characteristics. As with other soluble fiber products, the product of the subject invention can be used to help reduce cholesterol and triglyceride levels. Furthermore, it has been discovered that the soluble fiber product of the subject invention can be used in conjunction with medications which reduce cholesterol and triglyceride levels. Surprisingly, the use of the instant soluble fiber composition does not reduce or compromise the effects of the cholesterol or triglyceride medication, and, in fact, substantial reductions in cholesterol and triglyceride levels were achieved.

In a preferred embodiment, the protein-enriched soluble fiber compositions of the subject invention can be produced using a three-step process. In a first step, the protein and soluble fiber components are blended to create a uniform, homogenous dispersion. The protein component should be at least about 25% and preferably about 40 to about 45%. The protein component can be, for example, egg albumin, and should not be denatured at the beginning of the process. Those skilled in the art having the benefit of the teachings provided herein would readily recognize that other proteins could be used in the process of the subject invention. Also, a mixture of proteins can be used. The soluble fiber used according to the subject invention can be one or more of such fibers well known to those skilled in the art. For example, guar gum and/or pectin can be used as described herein. The soluble fiber component can be up to about 75% of the composition. Preferably, the soluble fiber component is about 50% to about 60%.

The protein and soluble fiber can be mixed in any appropriate device which will create a uniform, homogenous dispersion. For example, a ribbon blender can be used to slowly tumble the ingredients. The time of blending can be, for example, about 5 minutes to about 20 minutes, or more. In one embodiment of the subject invention, an edible oil is added to the muuure of soluble fiber and protein. The oil can be, for example, canola oil or other such vegetable oil. The amount of oil can be from 0% to about 5%. An oil content of about 3.5% is preferred. The oil can be blended with the protein and soluble fiber. The blending should be of a duration and nature to create an essentially dry, uniform dispersion without lumps.

As an additional aspect of the first step of the process of the subject invention, water is added to the protein and soluble fiber mixture. Water content of the composition should be less than about 55%, preferably less than about 50% and more than about 40%, and, most preferably, between about 46 and about 48%. Once the proper moisture content is achieved, the composition passes on to the second step of the process, which is the extrusion step.

During the extrusion step of the subject invention, the soluble fiber and protein composition is subjected to pressures sufficient to force the protein and soluble fiber into close proximity at the molecular level so that the soluble fiber can become entrapped within a protein matrix upon denaturing of the protein.

Upon exiting the extruder, the soluble fiber and protein composition is subjected to the third stage of the process, which is a drying step. The drying step is preferably carried out at temperatures which are sufficient to denature the protein, in addition to removing water. This temperature may be, for example, above about 300° F. and, preferably, is about 400° F. for about 5–10 minutes. The drying process can continue for additional time at, preferably, lower temperatures in order to reduce the water content to less than about 5%. For example, subjecting the composition to about 15 to about 20 minutes at about 300° F. has been found to reduce the moisture to between about 1% and about 2%.

After drying, the composition of the subject invention can be subjected to standard milling and sizing steps. The mesh used for the sizing step according to the subject invention is preferably smaller than 200 mesh. A mesh size between 200 and 300 is preferred, with about 250±25 particularly preferred. Finally, the composition can undergo an agglomeration step with, for example, gum arabic. When the composition is ready for shipping, it can be put, for example, into cans, and the moisture content at that point may be, for example, about 5%.

A suitable protein used in this invention can be any form of a water soluble, edible protein as long as it has not been denatured prior to the start of the process. Preferred protein sources include egg white and skimmed milk. The egg white, skimmed milk, or other protein is preferably dried.

The soluble fiber used as the starting material for the method is preferably guar gum and/or a pectin. Locust bean gum and psyllium, for example, can also be used. The pectin may be a citrus (e.g. grapefruit) HM pectin. Dry base commercially prepared pectins are readily available.

A person skilled in the art having the benefit of this disclosure can appreciate that other materials can be advantageously entrapped in the protein matrix.

Following are examples which illustrate procedures for practicing the invention. These examples should not be construed as limiting. All percentages are by weight and all solvent mixture proportions are by volume unless otherwise noted.

EXAMPLE 1

Preparation of Protein-Enriched Soluble Fiber Composition

The process of the subject invention comprises an initial mixing step followed by a compression step wherein water, protein, and a soluble fiber are subjected to sufficient pressures to hydrate the soluble fiber and cause the soluble fiber to be integrally incorporated into the protein matrix. In a preferred embodiment of the subject invention, extrusion is used to supply the pressure for this second step of the process.

The initial composition subjected to the process of the subject invention can comprise approximately 40–45% of a protein source or mixture of proteins, about 50–55% of a soluble fiber or mixture of soluble fibres, and, preferably, about 1–5% of an oil. In a preferred embodiment, the protein source may be egg white, the soluble fiber may be a mixture of guar gum and pectin, and the oil may be a vegetable oil such as canola oil. In one specific example, the percentage of the components may be about 44% egg white, 42% guar gum, 11% pectin, and 3% canola oil.

The pressure step of the subject invention is followed by a drying process which preferably includes a sizing procedure. The drying step reduces the water content to less than about 5% and preferably to about 1–2%. The drying process can be, for example, a three-stage process in which the first stage involves heating to about 400° F. for about 5–10 minutes; the second stage heats the composition to about 300° F. for about 5–10 minutes; and the third stage is a cool-down step. These drying steps can be preceded by a hot steam bath treatment. After the heating and drying steps, the composition is sized by, for example, passing through a mesh of about 250±25 size. The final composition can then be easily packaged, stored, and shipped. The composition can be used by, for example, reconstituting with water.

The present method allows for the isolation of the protein-enriched soluble fiber composition in granular form. In certain instances, further milling of the product is desirable.

EXAMPLE 2

Specific Soluble Fiber Composition

In one specific embodiment, the composition of the subject invention may have the following formula:

Egg white 43.5%
Guar gum 41.7%
Citrus pectin 11.3%
Canola oil 3.5%

A typical serving may contain approximately 12 grams of materials. Of this 12 grams, there are about 5 grams protein and 5 grams of soluble fiber with the balance being primarily oil and water.

EXAMPLE 3

Food Products Using Protein-Enriched Soluble Fiber Composition

The protein-enriched soluble fiber composition prepared by the described method can be included in various foodstuffs and used as a dietary supplement. Typical products in which the soluble fiber composition finds use includes jams, marmalades, jellies, preserves, and fruit butters; in frozen food compositions such as ice cream and sherbet; in baked goods such as cookies, pastries, and other foodstuff containing wheat and other flour; in beverages such as juice; in toppings, sauces, and puddings; and in salad dressings. In liquid foods and beverages, the composition will typically be an additive, whereas the product can be directly incorporated into dry products during the manufacturing process. Dry products can include cereals and oatmeal.

The protein-enriched soluble fiber composition of the present invention is not only nutritious, because of high protein concentrations, but also is useful as a dietary supplement which is effective in lowering plasma cholesterol. Wide application of the soluble fiber product of the subject invention in foods is also possible without impairing the physical properties and the tastes of the foods.

Orange juice, using the products of this invention, can be prepared. The product of Example 1 can be dissolved in orange juice in a ratio of 11.8 g product/250 ml juice. The product readily disperses in the juice, and there is no change in the hedonic characteristics of the orange juice.

The products of Example 1 can also be added to fruit bars, toffee bars, and cold cereal. The products can be seasoned and used as croutons on tossed salad.

EXAMPLE 4

Use of Protein-Enriched Soluble Fiber Compositions With Medications

The compositions of the subject invention are particularly advantageous because they can be used in conjunction (sequentially or simultaneously) with prescription medications for lowering cholesterol or triglyceride levels. Such medicines include, but are not limited to, MEVACOR, LESCOL, ZOCAR, and LOPID. Advantageously, these medications, when used together with the composition of the subject invention, result in substantial decreases in levels of total cholesterol and triglycerides.

The invention now being fully described, it will be apparent to one of ordinary skill in the art that various changes and modifications can be made without departing from the spirit or scope of the invention.

I claim:

1. A method for entrapping a soluble fiber compound within a protein matrix, wherein said method comprises the following steps:
   (a) said soluble fiber compound is first mixed with undenatured protein to create a uniform dispersion, wherein said dispersion created comprises protein at a concentration of at least about 25% and soluble fiber at a concentration of less than about 75%;
   (b) the dispersion created in step (a) is then mixed with water and subjected to elevated pressures, wherein said pressures reduce the water content of the composition to less than about 50%, thereby forcing said protein and said soluble fiber compound into close molecular proximity; and
   (c) the dispersion is then subjected to heat of at least about 300° F., thereby entrapping the soluble fiber compound within the protein matrix, and wherein said heating process reduces the water content of the composition to less than about 5%; wherein said soluble fiber compound is selected from the group consisting of locust gum, guar gun, pectin, gum arabic, and psyllium.

2. The method, according to claim 1, wherein said soluble fiber compound is selected from the group consisting of guar gum and pectins, and the protein is selected from the group consisting of egg white and skimmed milk.

3. The method, according to claim 1, wherein said pressure is applied by an extrusion process.

4. The method, according to claim 1, wherein the dispersion created in step (a) comprises protein at a concentration of about 25% to about 60% and soluble fiber at a concentration of about 40% to about 75%.

5. The method, according to claim 4, wherein said composition further comprises up to about 5% edible oil.

6. The method, according to claim 5, wherein said oil is a vegetable oil.

7. The method, according to claim 3, wherein the composition exiting the extrusion step is heated to at least about 300° F. for at least about 5 minutes.

8. The method, according to claim 7, wherein the composition exiting the extrusion step is heated to about 400° F. for about 5 to 10 minutes followed by heating at about 300° F. for about 15 to 20 minutes.

9. The method, according to claim 1, which further comprises a sizing step wherein particles smaller than about 200-mesh are created.

10. A composition comprising a soluble fiber compound entrapped within a protein matrix wherein said soluble fiber compound entrapped within a protein matrix has the characteristics of that which is produced by the following steps:
    (a) said soluble fiber compound is first mixed with undenatured protein to create a uniform dispersion, wherein said dispersion created comprises protein at a concentration of at least about 25% and soluble fiber at a concentration of less than about 75%;
    (b) the dispersion created in step (a) is then mixed with water and subjected to elevated pressures, wherein said pressures reduce the water content of the composition to less than about 50% thereby forcing said protein and said soluble fiber compound into close molecular proximity; and (c) the dispersion is then subjected to heat of at least about 300° F., thereby entrapping the soluble fiber compound within the protein matrix, and wherein said heating process reduces the water content of the composition to less than about 5%; wherein said soluble fiber compound is selected from the group consisting of locust gum, guar gun, pectin, gum arabic, and psyllium.

* * * * *